July 31, 1945. S. K. WELLMAN 2,380,900
FRICTION DEVICE
Filed Feb. 26, 1942 3 Sheets-Sheet 1

INVENTOR:
S. K. Wellman
BY
Ray S. Gehr
ATTORNEY.

July 31, 1945.  S. K. WELLMAN  2,380,900
FRICTION DEVICE
Filed Feb. 26, 1942   3 Sheets-Sheet 2

INVENTOR:
BY S. K. Wellman
Ray A. Fehr
ATTORNEY

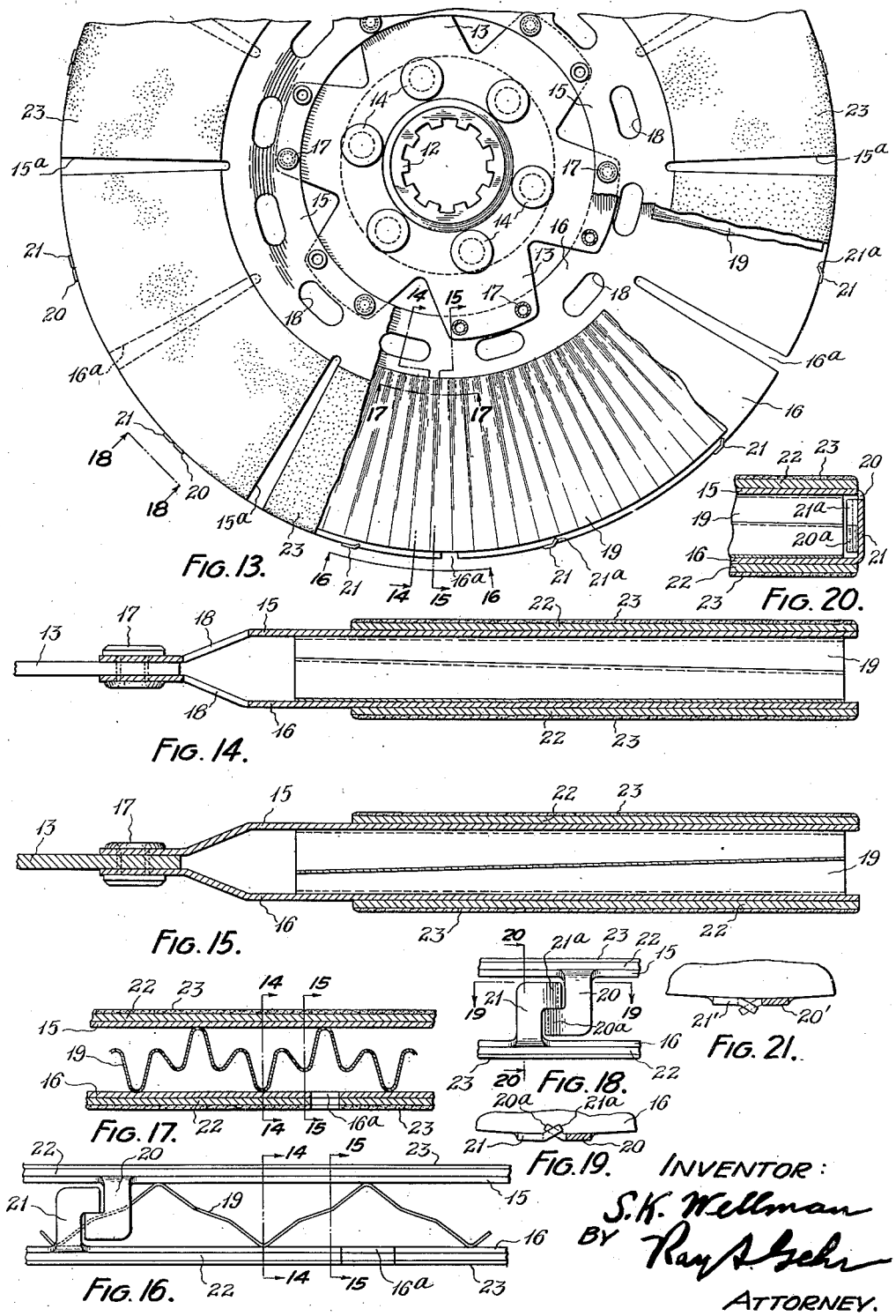

Patented July 31, 1945

2,380,900

UNITED STATES PATENT OFFICE 2,380,900

FRICTION DEVICE

Samuel K. Wellman, Cleveland Heights, Ohio, assignor to The S. K. Wellman Company, Cleveland, Ohio, a corporation of Ohio Application February 26, 1942, Serial No. 432,439

18 Claims. (Cl. 192—107)

This invention relates to disk-type friction devices such as clutches and brakes and particularly to such devices in which one or more friction elements are provided with resilient cushioned support to facilitate smooth and uniform action of the device. Such friction elements ordinarily are in the form of an annulus which may be either a continuous annular unit or a plurality of segments arranged in annular form.

The present application is a continuation in part of my copending application Serial No. 304,-539, filed November 15, 1939.

Disk type clutches and brakes as heretofore constructed have been subject to various faults including overheating with resultant deterioration of the friction elements and interference with the proper operation of the device, lack of adequate flexibility of the mutually engaging friction parts or, alternatively, unduly complicated structural features designed to secure flexibility, undue wear of the mutually engaging friction parts and unevenness of such wear and lack of smoothness in the engagement of the mutually engaging friction parts.

With a view to improving this type of clutches and brakes in the respects indicated and in various other ways I have sought in the present invention to attain a number of ends indicated below.

The invention has for one of its more general objects the provision of a friction device having a friction element and means affording said element a cushioned or floating support and which is simply constructed and capable of reliable operation over long periods of time and under severe operating conditions.

It is also an object of the invention to provide a friction device having a friction member and resilient compressible supporting means therefor in the form of an arcuate sheet metal spacer formed with corrugations extending from the inner edge part to the outer edge part thereof and susceptible of being easily and cheaply formed from straight strip sheet metal stock, such a spacer taking the form either of a unitary complete annulus or of an annular segment with a plurality of such segments making up the complete annular spacing means of the device.

Another object of the invention is to provide a friction device having a friction member and resilient compressible supporting means for the member in the form of an arcuate sheet metal spacer formed with corrugations extending from the inner edge part to the outer edge part thereof and capable of affording predetermined resistances to compression in the direction of its thickness at different radial distances from its axis.

Another object of the invention is to provide a friction device having a friction member and resilient compressible supporting means for the member in the form of an arcuate sheet metal spacer formed with corrugations extending from the inner edge part to the outer edge part thereof and capable of affording uniform resistance to compression in the direction of its thickness throughout its radial width.

A further object of the invention is the provision of a friction device having a friction member and resilient compressible supporting means for the member in the form of an arcuate sheet metal spacer formed with corrugations extending from the inner edge part to the outer edge part thereof and in which compression of the corrugated spacer in the direction of its thickness causes a flexing only of the spacer without frictional sliding thereof on its abutment or on the friction member so that the cushioning action is uniform and reliable and so that wear and deterioration are minimized.

Another object of the invention is to provide a friction disk for clutches, brakes and the like comprising two oppositely-facing friction members coaxially mounted and secured against relative rotation, and in which each of the friction members affords an abutment for the other through the action of a resilient spacing means having the characteristics enumerated in the above stated objects.

Still another object of the invention is to provide a friction clutch or brake disk of the character last referred to in which the overall thickness of the disk is such that it can be used to replace clutch disks of the conventional type employing relatively thick friction facings.

Another object of the invention is to provide a friction disk for clutches, brakes and the like comprising two oppositely-facing friction members coaxially mounted and secured against relative rotation, in which each of the friction members affords an abutment for the other through the reaction of a resilient spacing means and which comprises improved means for limiting the mutual separation axially of the two friction members and the mutual approach axially of said members.

Another object of the invention is to provide a friction device having a friction member and resilient compressible supporting means for the member in the form of an arcuate sheet metal spacer formed with corrugations extending from the inner edge part to the outer edge part thereof and in which the said spacer is capable of strongly resisting corrosion and the deteriorating effects of high operating temperatures.

Another object of the invention is to provide a clutch disk which has relatively low inertia by virtue of low weight, which has a uniform, smoothly-engaging action in operation, and in which wear of the friction material of the device is low and uniform.

The invention has for a further object the provision of a method of forming an arcuate corrugated sheet metal spacer having predetermined resistances to compression in the direction of its thickness at different radial distances from its axis.

In the case of both clutch and brake mechanisms it is possible, generally speaking, to mount a resiliently supported friction member either on an element that in operation is clamped between two other elements or on one or both of the two clamping elements. For example, in the case of a motor vehicle clutch the resiliently supported member may constitute a part of the clutch disk which is clamped between the engine fly wheel and the follower plate non-rotatably connected to the fly wheel, or it may be mounted on the fly wheel or the follower plate. In the first of the two cases the clutch disk usually comprises two disk members spaced apart by the resilient supporting means and then each of the two disks serves with respect to the other one as an abutment for the resilient member or means; whereas in the second case the fly wheel or the follower plate serves as abutment.

The present invention is applicable to either of the above types of construction, but usually it is preferable from the standpoint of cost and ease of repair or replacement to embody the resilient support in the clutch or brake disk. Accordingly, in the following description the invention is explained as embodied in a clutch disk as shown in typical forms in the accompanying drawings, which also illustrate the method of forming the novel resilient supporting member.

Figure 6:
Figs. 6 and 6a are diagrammatic views showing the forms of the outer and inner edges, respectively, of a corrugation of one design of the resilient spacer of the friction disk.
Figure 6A:
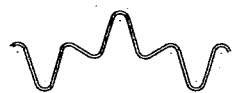

Figs. 7 and 7a, 8 and 8a, and 9 and 9a are three pairs of views corresponding to Figs. 6 and 6a but illustrating corrugation forms of different spacer designs.

Figures 10, 11, 12:
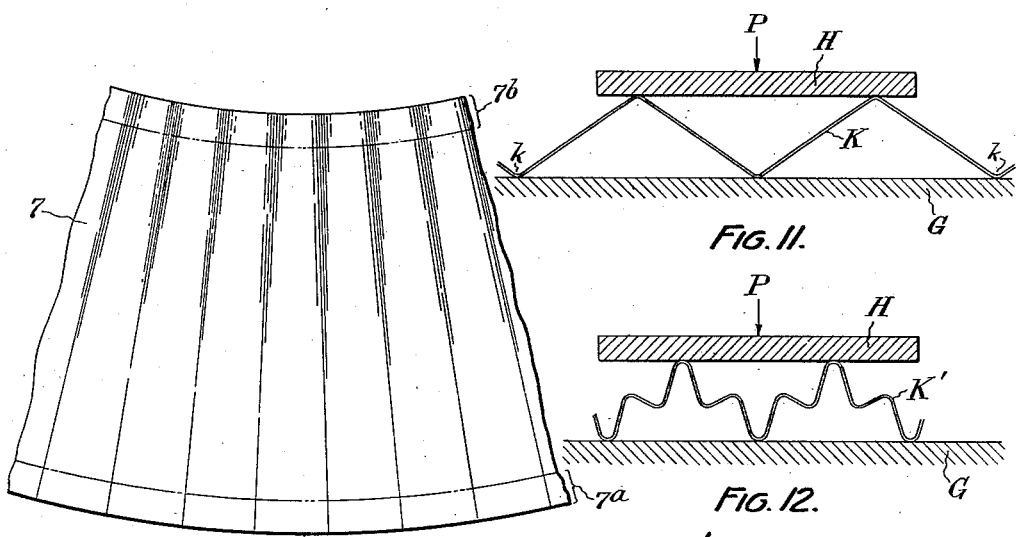

Fig. 10 is a face view of a fragmentary portion of the corrugated spacer of the disk shown in Figs. 1 to 5.

Figs. 11 and 12 are diagrams illustrating the method in which the form of the corrugated spacer may be determined experimentally.

Figure 1:
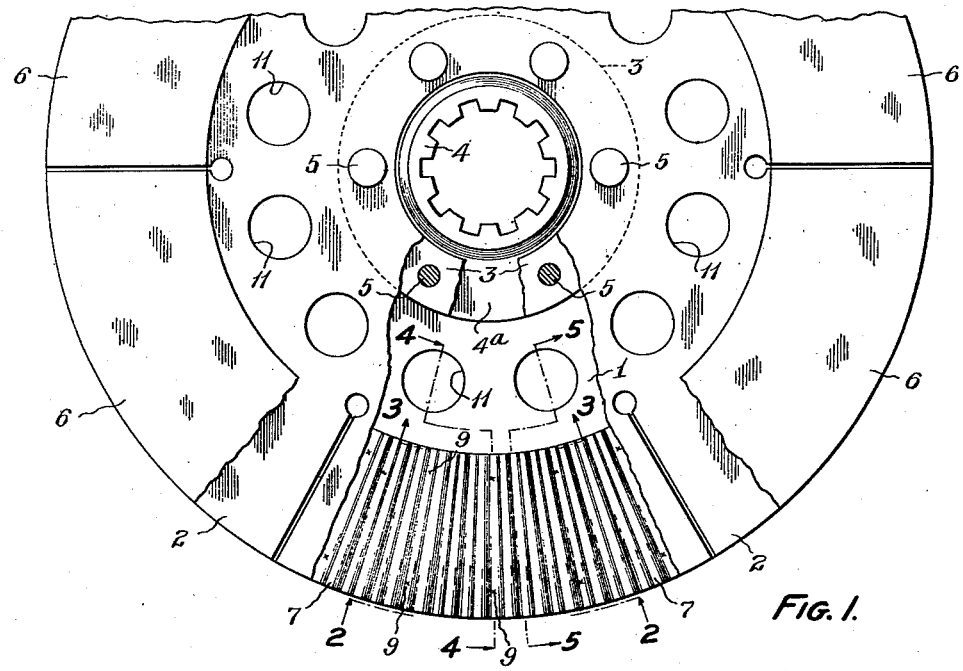
Fig. 1 is a face view of a friction disk, a part of which is broken away to permit illustration on a larger scale and other parts of which are broken away to show internal features of construction.

Fig. 13 is a face view of a modified form of friction disk, parts of the structure being broken away as in the case of Fig. 1.

Fig. 14 is an enlarged fragmentary section on the line 14—14 of Fig. 13.

Fig. 15 is an enlarged fragmentary section on the line 15—15 of Fig. 13.

Fig. 16 is an enlarged fragmentary edge view of the friction disk taken along the line 16—16 of Fig. 13.

Fig. 17 is an enlarged sectional fragmentary view taken on the line 17—17 of Fig. 13.

Fig. 18 is an enlarged fragmentary edge view of the disk showing the interlocking connection between the annular disk elements.

Fig. 19 is a section on the line 19—19 of Fig. 18.

Fig. 20 is a section taken on the line 20—20 of Fig. 18.

Fig. 21 is a fragmentary section corresponding to Fig. 19 but illustrating a modification of the construction shown in Figs. 18 to 20.

Referring in detail to the structures illustrated in the drawings and first to Figs. 1 to 5, inclusive, the friction disk assembly there shown consists of a pair of flat annular disk elements 1 and 2 spaced apart axially at their centers by a spacing ring 3 and the flange 4a of hub 4, the said elements, flange and spacing ring being secured together by rivets 5, 5. Friction facing layers 6, 6 of sintered metal are secured to the remote or outer faces of the elements 1 and 2. A suitable composition for such friction material and the preferred methods for forming and sintering it, and for bonding it to the backing member are fully described in my United States Letters Patent No. 2,178,527.

A resilient corrugated spacing member 7 formed of thin sheet metal such as cold rolled shim stock is disposed between the disk elements 1 and 2, the corrugations in the spacing member extending approximately radially across it and being of sufficient length to back up the friction facing layers throughout their full width. The form of the corrugations contribute to the floating action of the assembly and will be described in detail below. The spacing member 7 in the particular construction shown is in the form of a full ring or annulus, the ends of which are overlapped as shown at 8. It is secured to the disk element 1 in any suitable manner, but preferably by means of spot-welds 9, 9 located at a sufficient number of points to provide the desired strength and restraint. Additional spot-welds 10 are also preferably provided to secure the spacing member 7 to the other disk element 2. The spacing member 7 when thus welded to the disk elements 1 and 2 serves to resiliently resist separation of the said elements from each other as well as their approach toward each other, as will readily be understood. Air inlet openings 11, 11 are provided in the assembly at appropriate locations to permit forced-draft cooling or ventilation when the disk is rotating.

Figure 3:
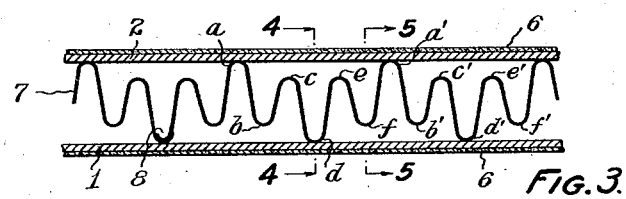
Fig. 3 is an enlarged sectional view taken on the line 3—3 of Fig. 1.
Figure 2:
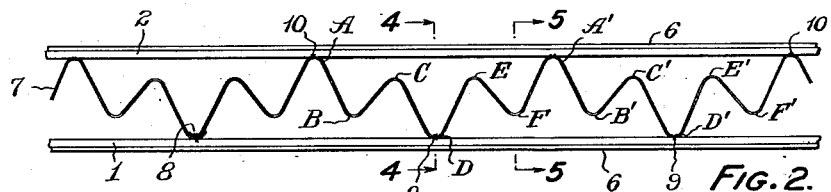
Fig. 2 is an enlarged fragmentary edge view of the disk taken along the line 2—2 of Fig. 1.

Referring now to Figs. 2 and 3 which show the appearance of the outer and inner edges, respectively, of the annular disk and spacer assembly, it will be seen that the spacing member consists of a repeating series of corrugations, each series including a major corrugation Aa, two intervening minor corrugations Bb, Cc, a second major corrugation Dd facing in the opposite direction with respect to major corrugation Aa, and another pair of intervening minor corrugations Ee and Ff. The series then repeats itself beginning with the major corrugation A'a'. It will be observed that the minor corrugations are in effect reverse curve folds in the flanks or webs of the major corrugations. The crests of the major corrugations A*a* and D*d* of each series contact the disk elements 2 and 1, respectively, while the minor corrugations B*b*, C*c*, E*e* and F*f* are of such effective height that they do not contact the disk elements at any time, even when the friction disk is clamped in working engagement between the opposed pressure plates which cooperate with it. It will be recognized that by reason of this construction, the disk elements and the facing layers are resiliently supported upon the major corrugations and, because of the minor corrugations, are cushioned over their entire area. Moreover, the cushion effect exists even when the assembly is clamped between the pressure plates which engage the facing layers, since the spacing member is designed to remain in a resilient condition when supporting the normal working load applied to the assembly by the pressure plates. It will therefore be understood that under normal working conditions the disk elements 1 and 2 do not come into contact with any incompressible spacing members which restrict their motion toward each other, and consequently may be further compressed together when circumstances demand it. By reason of this feature the assembly is capable of accommodating itself to very considerable unevenness or warpage in the surfaces of the pressure plates, and also is capable of accommodating itself to any angular misalignment of the respective axes of rotation of the assembly and the pressure plates. It consequently embodies limited universal motion in combination with the advantages of cushion action.

It will be apparent that the above mentioned clutch features can be secured with a variety of forms of corrugated spacing members. In all forms, however, the use of radial corrugations offers further advantages in addition to those resulting from the floating action, since it best provides for forced-draft ventilation and cooling of the assembly, and furthermore, permits the spacing member to be formed from strip metal having the same width which is desired in the annular spacing member. The ventilating feature will be understood without further explanation, it being apparent that rotation of the clutch will cause the spacer 7 to set up a centrifugal force on the air between the disk elements 1 and 2 so that a strong current of air will be drawn in constantly through openings 11 and forced outward over the inner surfaces of said elements with a strong cooling effect upon them. The other advantage, namely, that of being formable from strip metal, will now be explained.

In order to form corrugated segments or circles from straight strip metal, it is necessary, if the strip metal is to remain of uniform thickness, to crowd or gather a given length of metal into a shorter space on one edge of the strip than on the other edge. This, of course, is due to the fact that one edge forms a circle of smaller diameter than the other. The form of corrugated spacing member illustrated permits the metal to be gathered at the inner edge to such an extent that straight strip may be formed into circular annuli, or arcuate sections thereof, having inner diameters on the order of an inch or so upward, and having wide ranges of annulus width. It will be noted in Figs. 4 and 5 that this is possible because the metal may be gathered in the minor corrugations B*b*, C*c*, E*e* and F*f*, their height being adjusted to absorb whatever excess metal occurs at the inner edge. Referring specifically to the series of corrugations beginning on the outer edge (Fig. 2) at the apex of major corrugation A and ending at the apex of major corrugation A', it will be seen that the corresponding series of corrugations at the inner edge (Fig. 3) begins at the apex of corrugation *a* and ends at the apex of corrugation *a*'. Inasmuch as this series of corrugations has the attributes of a geometrical wave, the distance between major corrugations A*a* and A'*a*' may conveniently be referred to as the wave-length of the series. The same linear length of metal is included between the points A, A' at the outer edge of the member as between the points *a*, *a*' at the inner edge of the member, but the metal is crowded into a shorter circumferential space at the inner edge than at the outer edge. As indicated above, this is accomplished by adjusting the heights of the minor corrugations, keeping their crests, of course, well below the apex of the major corrugations, and preferably below them by an amount appreciably greater than the cushion deflection which is desired in the spacing member.

Figure 4:
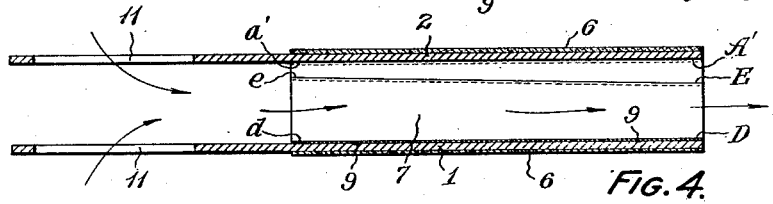
Fig. 4 is an enlarged sectional view taken on the line 4—4 of Figs. 1, 2 and 3.
Figure 5:
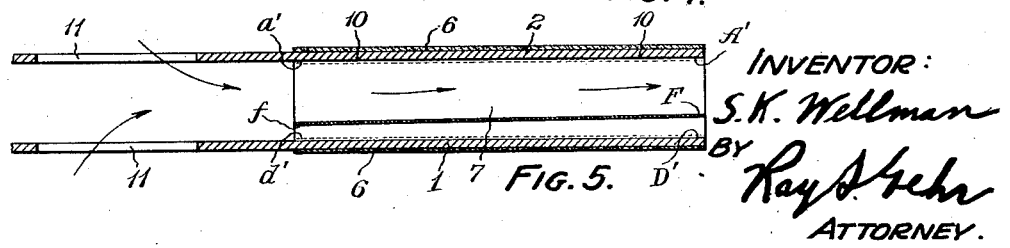
Fig. 5 is an enlarged sectional view taken on the line 5—5 of Figs. 1, 2 and 3.

It will be noted that the crests of the minor corrugations are not parallel to the crests of the major corrugations, the crest of minor corrugation E*e* in Fig. 4 being inclined in one direction with respect to the crest of the major corrugations, while the crest of minor corrugation F*f* is inclined in the opposite direction. This is because the height of the minor corrugations at the inner edge of the annulus is greater than the height of the same minor corrugations at the outer edge. It will consequently be appreciated that if the height of the minor corrugations with respect to that of the major corrugations is adjusted to provide the desired deflection of the spacing member at the inner edge, then a greater possible deflection will automatically exist at the outer edge. This fact makes it possible to design the inner edge first, letting the outer edge follow as it will. This process may be carried almost to the extreme condition in which the minor corrugations disappear at the outer edge of the major corrugation web which then extends straight from one major corrugation to the next. In general, however, this extreme condition should be avoided since it impairs the resilience of the spacing member at the outer edge.

It will be understood from what has been said above that the linear length of metal included in a wave-length of the above described floating-type spacing member may be varied within limits which permit various amounts of cushion effect. It should also be understood that these permissible variations in linear length also permit adjustment in the strength or modulus of the spring action which is involved. For example, when the minimum linear length of metal is used in a wave-length of the spacing member, the minor corrugations disappear at the outer edge, the outer edge then appearing as a series of major corrugations joined with unflexed web or flank portions. As previously indicated, this condition gives a spacing member having at its outer edge little if any elastic yield and a maximum resistance to compression. If, however, a slightly greater linear length of metal is used, the minor corrugations will exist at the outer edge, and the elasticity will be increased an appreciable amount. Thus, a relationship exists between the length of metal which is used and the resulting elastic resistance to compression, the latter decreasing with increased linear length of metal. In view of this condition it will be apparent that by providing the proper length of metal in each wave length, and by providing a suitable thickness of metal in the spacing member, desired values of strength and elasticity may be secured for the spacer. Furthermore, it is possible to design such a floating-type annular spacing member to have the same resistance to compression at its inner and outer edges (as well as at intermediate points), notwithstanding that the circumferential wavelength is greater at the outer edge than at the inner edge of the spacer. This is due to the fact that the corrugated spacer presents two opposing factors determining its resistance to compression. One factor is that the major corrugation crests (which sustain the compressive pressures of the disks 1 and 2) are spaced more closely at the inner edge than at the outer edge of the spacer; and this tends to make the spacer's resistance to compression greater at its inner edge than at its outer edge. The other factor is that the webs of the corrugation, at the outer periphery of the spacer, can be made to approach a straight form as nearly as may be desired, while the inner part of the spacer remains more deeply corrugated, and in this way the outer part of the spacer is given enough resistance to compression to compensate for the first factor which, as stated, tends to give the spacer greater resistance at the inner edge of the spacer. Indeed the resistance to compression at the outer edge of the spacer increases so much as the webs of the corrugations closely approach straight lines at the outer edge of the spacer that the latter can be given a resistance to compression at its outer edge even greater than that at its inner edge. Thus by suitably selecting the length of the metal strip forming the wave length of the spacer, the latter can be given a resistance to compression that is either substantially uniform from edge to edge or that either increases or decreases from one edge toward the other. As a result it is possible by design to control the resistance characteristics of the spacer. For example, if in any particular design of clutch the friction facings tend to wear unequally at different radial distances from the clutch axis, such tendency can be counteracted by making the resistance of the spacer to compression less where the wear tends to be greater.

The above-described principle involved in the spacer 7 is illustrated by the diagrammatic views of Figs. 6 to 12. Thus, Figs. 6 and 6ª represent the forms of the spacer corrugations at the outer and inner edges of the spacer, respectively, in a design of the spacer in which the corrugations at their outer edges have straight flanks or webs. The major corrugation lengths at the outer and inner edges of the spacer shown in Figs. 6 and 6ª, as well as in the other diagrammatic views, correspond to the structure shown in Figs. 1 to 5, inclusive, except in the case of Figs. 9 and 9ª which correspond to a spacer of the same outer diameter as that shown in Figs. 1 to 5 but of only half its radial width.

Figure 7:

Figs. 7 and 7ª show the outer and inner edges of a form of corrugation using a somewhat longer strip of metal than that used in Figs. 6 and 6ª.

Figure 8:
Figure 8A:

Figs. 8 and 8ª similarly show corrugations utilizing still greater length of metal in the corrugation, the form of corrugation shown being approximately that utilized in the design shown in Figs. 1 to 5, inclusive.

Figure 9:
Figure 9A:

Figs. 9 and 9ª show the outer and inner edges, respectively, of a modified type of corrugation in which the flanks or webs are given a simple curvature instead of a reverse curvature as in the other forms illustrated. As will be apparent, the simple form of curvature will not permit as wide a variation in the length of metal forming the corrugation as will the reverse curved corrugations. However, the corrugation with simple curvature may be useful where the diameter of the spacer is relatively large and its radial width is relatively small.

In Figs. 11 and 12 I have indicated a method for experimental determination of the form of corrugation to be utilized in the design of the resilient spacer. The purpose of the experimental method is to determine the relative resistance to compression of the outer and inner edge portions of the spacer for any given form of corrugation, and the method is based upon the testing of narrow strips of metal corrugated to simulate outer and inner edge portions of the spacer. As shown in Fig. 11, I provide a metal base G of a length somewhat greater than two major corrugations and a pressure bar H of somewhat greater length than a single corrugation and mount upon the base G a rather narrow strip of metal K bent to simulate a tentative form of corrugation for the outer edge of the spacer being designed. The strip K is preferably attached to the base G at points k, k by means of clamps or otherwise. The strip K is intended to represent a circumferential element of the spacer at the outer edge thereof as indicated at 7ª by the dot-and-dash line in Fig. 10, although for convenience the strip may be formed with its lateral edges straight instead of curved without materially affecting the action of the strip. When the pressure bar H is then placed on the corrugation crests of the strip K as shown in Fig. 11 the deflection of the corrugated strip may be noted upon the application of a predetermined pressure at P, or alternatively the pressure required to give a predetermined compression may be noted.

Similarly a strip of metal K' corrugated to correspond to an inner edge element of the same spacer (as indicated at 7ᵇ in Fig. 10) is mounted on base G, as shown in Fig. 12, and tested as in the case of strip K. Then a comparison of the compressions (or forces) required in the two tests will indicate whether the corrugation form tested gives the desired resistance characteristics for the spacer. By varying the length of the metal strips K and K' and checking the different lengths as to resistance to compression a suitable length to give the desired resistances at the outer and inner edges of the spacer may thus be determined experimentally.

It may be observed that as long as only relative resistances to compression are to be determined the experimental test strips need not be made of the same thickness as that to be used in the spacer, and usually it is convenient to use test parts of an enlarged scale.

By the use of such experimental method the marked stiffness of the corrugations with straight flanks as shown in Fig. 11 is readily demonstrated as is also the effect of lengthening the metal strip K so as to give a slight curvature to the webs of the corrugation. By lengthening the strip K very slightly (in comparison with the straight web form of Fig. 11) it can be made to resiliently respond to pressure and yet resist such pressure more strongly than will the strip K' when made of the same increased length as the strip K. In other words, such increased length of the strip of metal may be used for the corrugation length of a spacer that will afford a greater resistance to compression at its outer edge than at its inner edge.

Figure 7A:
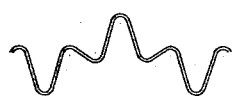

Similarly by using a still greater length of metal for the strips K and K' a form of corrugation such as that indicated in Figs. 7 and 7a is produced and such form is found to give approximately uniform resistances to compression throughout its radial width. Finally, if the length of the strips K and K' is increased to that indicated in Figs. 8 and 8a it is found that the resistance to compression offered by the strip K, corresponding to the outer edge of the spacer, is less than that offered by the strip K' which corresponds to the inner edge of the spacer. The spacer embodied in the friction disk shown in Figs. 1 to 5 has operating characteristics such as last referred to.

When it is desired to produce a resilient spacer having predetermined cushioning characteristics the method or procedure may be varied more or less but preferably includes the following steps. First, the radii of the outer and inner edges of the spacer should be fixed. Next the number and corresponding angular extent of the major corrugations may be settled upon. Then a tentative length of metal strip for each major corrugation may be assumed. With the foregoing data fixed or settled upon the experimental checks described above may be carried out. For this purpose two narrow metal strips simulating the outer and inner edge elements, respectively, or the spacer are prepared and formed with not less than two major corrugations determined as to shape by the assumed length of the strip. The two narrow metal strips are then tested as to their resistance to compression. If, upon test, the strips as first formed do not have the desired relative resistances to compression, repeated tests are carried out with similar pairs of narrow strips of different lengths than that first chosen and with correspondingly different corrugation forms, until corrugation forms are secured that give predetermined relative resistances to compression for the outer and inner edges of the spacer. The next step then is the preparation of a rectangular strip of sheet metal of the predetermined width of the spacer and of a length corresponding to the predetermined number of major corrugations and the experimentally-determined corrugation strip length. Finally this rectangular strip of metal is bent to form diverging transverse corrugations of the predetermined angular widths at the respective edges of the strip and having at the edges of the strip the corrugation forms corresponding to the said experimentally-determined strip length.

Figs. 13 to 20 show a modified form of friction disk which makes use of a resilient spacer of the same type but of different design than that used in the construction of Figs. 1 to 5 and differs from the latter construction in several other respects. In the second design, 12 is the disk hub and 13 is a spider secured to the flange of the hub by rivets 14. To the outer ends of the spider arms or spokes, disk elements 15, 16, formed of sheet steel, are secured by means of rivets 17, the inner edge portions of the disk elements 15, 16 being offset toward each other to embrace the faces of spider 13 as shown in Figs. 14 and 15. The elements 15, 16 are provided with apertures 18 to admit air between the elements and the said elements are also preferably provided with a series of radial slots 15a, 16a, the slots 16a of the element 16 being circumferentially offset in relation to the slots of element 15 as indicated in Fig. 13. The assembly is provided with a corrugated spacer 19 formed by the method already described from a single straight strip of sheet metal, preferably stainless steel, and having the same general character as the spacer shown in Figs. 1 to 5 but a different form of corrugation. As in the first form of construction, the spacer strip has its two ends overlapped and welded together but it is not welded to the disk elements 15, 16, the latter being operatively connected at their outer peripheries by other means.

The connecting means last referred to consist of angular stop members 20 and 21 carried, respectively, by the disk elements 15 and 16 and having their lateral extensions 20a and 21a turned radially inward so as to interlock as shown in Figs. 18, 19 and 20. The lengths of the stop members 20, 21 being somewhat less than the normal operative distance between the inner faces of the disk elements 15, 16, it will be seen that the inwardly turned extensions 20a and 21a serve to limit the mutual approach of the disk elements at their outer peripheries while, of course, the mutual engagement of the lateral extensions 20a, 21a positively prevent undue separation of the disk elements. The stop means 20, 21 may be secured in any desired manner to their respective disk elements 15 and 16 but in the construction shown are formed integral therewith.

The disk elements 15 and 16 may, if desired, be provided with sintered metallic friction facings of the same character as the friction facings of the first described construction. However, I have shown a modified and preferred form of friction facing in which layers 22 of sintered copper powder are bonded to the outer faces of the steel disk elements 15 and 16. Such layers of copper may be briquetted and sintered to the elements 15 and 16 in the manner described in my above mentioned Patent No. 2,178,527.

To the copper layers 22 are in turn sintered outer friction layers 23, 23 corresponding to the friction layers 6 of the first described construction and having suitable compositions such as disclosed in the said Patent No. 2,178,527. The purpose of the copper facing layers 22, 22 is to afford heat flow paths of high conductivity from all parts of the outer facing layers 23 to all parts of the steel disk elements 15 and 16 so that localized or unequal heating of the latter is obviated. The significance of this is not further dwelt upon here since this feature of the construction is more fully explained and claimed in the copending application of the present applicant and C. B. Sawyer, Serial No. 443,562, filed May 19, 1942.

It may be pointed out that, since in the construction shown the disk elements 15 and 16 are offset at their inner edges and have the stop means 21, 21 extending inward from the inner faces of the disk elements, the facing layers 22 and 23 can best be sintered to the steel elements 15 and 16 while they remain in their flat form, the offsetting of the inner portions of the disks 15 and 16 and the lateral bending of the stop means 20, 21 being effected in suitable dies after the sintered facing layers have been applied to the steel disks.

In some instances it may be desirable to stop or limit expansion or separation of the disk elements 15, 16 without limiting their cushioned approach toward each other. In such instances the stop means 20, 21 may be modified as indicated in Fig. 21 where the stop means 20' and 21' have their lateral extensions bent outward instead of inward so that they do not engage the disk elements 15 and 16, respectively.

As has been stated, the form of the spacing element 19 is of the same general character as the spacing element of the first described construction. However, the specific form of the spacer 19, determined in accordance with the method or procedure above described, is such that the spacer offers substantially uniform resistance to compression throughout its radial width.

Furthermore, as has been stated, I prefer in carrying out my invention to make the spacer of stainless sheet steel material. There are several reasons for this, one reason being that clutch and brake disks having sintered metal friction facings suitably bonded to their backing members are capable of operation under very severe conditions in which a large amount of energy is dissipated in the form of heat so that the parts attain high temperatures in operation. Under these conditions of operation it has been found that if the spacer is made of ordinary spring steel material the hardness and elasticity of the metal are seriously reduced with corresponding interference with the efficiency of the device, whereas stainless steel, such for example as the 18% chromium-8% nickel variety, is capable of withstanding the high operating temperatures referred to without injury. Also in the case of vehicle clutches and some brakes the interior parts of the clutch disk are subject to the action of oil and water vapors which, especially under the operating temperatures referred to, are subject to a substantial amount of corrosion and it has been found that spacers formed from the ordinary spring steels corrode to such an extent that their effective life is very seriously reduced whereas stainless steel remains substantially unaffected by the corrosive conditions. Finally, by reason of the great strength of stainless steel it is possible to use somewhat thinner sheet metal when the spacer is formed of stainless steel with resultant reduction in the weight of the peripheral part of the clutch disk.

Stainless steel material is especially susceptible to hardening by working and it is, of course, desirable to avoid undue hardening and resulting embrittlement of the resilient spacer. My improved method of forming the resilient spacers by bending alone, with a minimum of working, of the sheet material is, therefore, especially advantageous in the production of such members from stainless steel.

The improved resilient spacing member has been shown and described in connection with a pair of friction faced disk elements assembled to form a unitary friction disk, but it will be apparent from a consideration of the designs which have been described that the advantages of such spacing members may be realized in other forms of construction. For example, as was mentioned before, in some vehicle clutch assemblies the friction facing layer is secured to the engine fly wheel and/or pressure plate rather than to the driven disk which is clamped between the fly wheel and cooperating pressure plate. In such structures, the improved spacing members may be used as resilient supports between the friction member and fly wheel or between the friction member and pressure plate, or both. It will be recognized that in such constructions, the fly wheel or pressure plate acts as an abutment member just as each of the disk elements 1 and 2 of Fig. 1 or 15 and 16 of Fig. 13 acts as an abutment for the spacing member with respect to the pressure of the other disk element. Various other applications of the spacing member will be apparent wherein it is desired to provide limited universal action and cushioning effect, with or without forced draft ventilation.

From the foregoing description it will be apparent that all of the various objects enumerated at the outset are advantageously attained in the structures illustrated and described. And, from the nature of the invention, it will be appreciated that the advantages in question can be attained with various modifications of the specific structures illustrated in the drawings without departing from the invention as defined in the appended claims.

What I claim is:

1. In friction apparatus, the combination of a disk element having on one side thereof an annularly-extending friction surface, an abutment member disposed adjacent the other side of the disk element and secured against rotational movement relative to said element and means for resiliently supporting the disk element comprising an arcuate sheet metal member interposed between the said element and the said abutment, the sheet metal member being of substantially uniform sheet thickness throughout and formed with corrugations extending from the inner edge part to the outer edge part of the member with their oppositely-facing crests disposed in two parallel planes at right angles to the disk axis and the length of the sheet metal between adjacent corrugation crests being substantially the same along all cylindrical surfaces concentric with the arcuate member from the inner edge to the outer edge thereof, whereby the corrugated arcuate member may be formed by bending straight strip sheet metal stock.

2. Friction apparatus as claimed in claim 1 in which the length of the sheet metal of the corrugated arcuate member between adjacent corrugation crests and the corresponding curvature of the corrugation webs are such that the corrugated member from the inner edge part to the outer edge part thereof offers substantially uniform resistance to compression by the friction disk element and the abutment.

3. Friction apparatus as claimed in claim 1 in which the length of the sheet metal of the corrugated arcuate member between adjacent corrugation crests and the corresponding curvature of the corrugation webs are such that the corrugated member offers a resistance to compression between parallel surfaces engaging the corrugation crests of the member that is less at the outer edge of the member than at its inner edge.

4. Friction apparatus as claimed in claim 1 in which the length of the sheet metal of the corrugated arcuate member between adjacent corrugation crests and the corresponding curvature of the corrugation webs are such that the corrugated member offers a resistance to compression between parallel surfaces engaging the corrugation crests of the member that is greater at the outer edge of the member than at its inner edge.

5. Friction apparatus as claimed in claim 1 in which the abutment member is in the form of a second disk element similar to and concentric with the other disk element and secured against rotation in relation thereto but with the friction surface of the second disk element disposed oppositely to that of the other disk element and in which the corrugated supporting member is disposed between the two disk elements so that each disk element serves as abutment for the corrugated member with respect to the other disk element.

6. Friction apparatus as claimed in claim 1 in which the length of the sheet metal of the corrugated member between adjacent corrugation crests and the corresponding curvature of the corrugation webs are such that the corrugated member from the inner edge part to the outer edge part thereof offers substantially uniform resistance per unit area to compression in the direction of its thickness and in which the abutment member is in the form of a second disk element similar to and concentric with the other disk element and secured against rotation in relation thereto but with the friction surface of the second disk element disposed oppositely to that of the other disk element and in which the corrugated supporting member is disposed between the two disk elements so that each disk element serves as abutment for the corrugated member with respect to the other disk element.

7. Friction apparatus as claimed in claim 1 in which the corrugated sheet metal supporting member is formed of metal having high resistance to heat and corrosion.

8. Friction apparatus as claimed in claim 1 in which the corrugated sheet metal supporting member is formed of metal having great strength and high resistance to heat and corrosion.

9. Friction apparatus as claimed in claim 1 in which the corrugation crests of the resilient supporting member are fixedly attached to the friction element and the abutment member.

10. Friction apparatus as claimed in claim 1 in which the web sections of the corrugations of the resilient supporting member are curved in cross section and accommodate overall compression and expansion of the member in the direction of its thickness by modification of its corrugation web curvature.

11. Friction apparatus as claimed in claim 1 in which the web sections of the corrugations of the resilient supporting member have a reverse curvature in transverse cross section and accommodate overall compression and expansion of the member in the direction of its thickness by modification of its corrugation web curvature.

12. As a new article of manufacture, a resilient spacing and supporting means for friction elements of clutches and brakes consisting of an arcuate corrugated sheet metal member of substantially uniform sheet thickness throughout and having its corrugations extending divergently from its inner edge to its outer edge with their oppositely-facing crests disposed in two parallel planes at right angles to the axis of the arcuate member and having the length of the sheet metal between adjacent corrugation crests measured along all cylindrical surfaces concentric with the arcuate member from the inner ends to the outer ends of the corrugations substantially the same and greater than the direct distance between the crests of adjacent corrugations at the outer ends thereof, whereby the corrugated arcuate member may be formed by bending straight strip sheet metal stock.

13. As a new article of manufacture, a resilient spacing and supporting means for friction elements of clutches and brakes consisting of an arcuate corrugated sheet metal member of substantially uniform sheet thickness throughout and having its corrugations extending divergently from its inner edge to its outer edge with their oppositely-facing crests disposed in two parallel planes at right angles to the axis of the arcuate member and having the length of the sheet metal between adjacent corrugation crests measured along all cylindrical surfaces concentric with the arcuate member from the inner ends to the outer ends of the corrugations substantially the same and greater than the direct distance between the crests of adjacent corrugations at the outer ends thereof, whereby the corrugated arcuate member may be formed by bending straight strip sheet metal stock and further having the said length of the sheet metal between corrugation crests and the corresponding curvature of the corrugation webs such that the corrugated member offers substantially uniform resistance from the inner edge to the outer edge thereof to compression between parallel surfaces engaging the corrugation crests of the member.

14. As a new article of manufacture, a resilient spacing and supporting means for friction elements of clutches and brakes consisting of an arcuate corrugated sheet metal member of substantially uniform sheet thickness throughout and having its corrugations extending divergently from its inner edge to its outer edge with their oppositely-facing crests disposed in two parallel planes at right angles to the axis of the arcuate member and having the length of the sheet metal between adjacent corrugation crests measured along all cylindrical surfaces concentric with the arcuate member from the inner ends to the outer ends of the corrugations substantially the same and greater than the direct distance between the crests of adjacent corrugations at the outer ends thereof, whereby the corrugated arcuate member may be formed by bending straight strip sheet metal stock and further having the said length of the sheet metal between corrugation crests and the corresponding curvature of the corrugation webs such that the corrugated member offers a resistance to compression between parallel surfaces engaging the corrugation crests of the member that is less at the outer edge of the member than at its inner edge.

15. As a new article of manufacture, a resilient spacing and supporting means for friction elements of clutches and brakes consisting of an arcuate corrugated sheet metal member of substantially uniform sheet thickness throughout and having its corrugations extending divergently from its inner edge to its outer edge with their oppositely-facing crests disposed in two parallel planes at right angles to the axis of the arcuate member and having the length of the sheet metal between adjacent corrugation crests measured along all cylindrical surfaces concentric with the arcuate member from the inner ends to the outer ends of the corrugations substantially the same and greater than the direct distance between the crests of adjacent corrugations at the outer ends thereof, whereby the corrugated arcuate member may be formed by bending straight strip sheet metal stock and further having the said length of the sheet metal between corrugation crests and the corresponding curvature of the corrugation webs such that the corrugated member offers a resistance to compression between parallel surfaces engaging the corrugation crests of the member that is greater at the outer edge of the member than at its inner edge.

16. As a new article of manufacture, a resilient spacing and supporting means for friction elements of clutches and brakes consisting of an arcuate corrugated sheet metal member of substantially uniform sheet thickness throughout and having its corrugations extending divergently from its inner edge to its outer edge with their oppositely-facing crests disposed in two parallel planes at right angles to the axis of the arcuate member and having the sheet metal between adjacent corrugation crests of the same length measured along all cylindrical surfaces concentric with the arcuate member from the inner ends to the outer ends of the corrugations and of a reverse curved formation, whereby the corrugated arcuate member may be formed by bending straight strip sheet metal stock.

17. An article of manufacture as claimed in claim 12 formed of sheet metal having high resistance to heat and corrosion.

18. An article of manufacture as claimed in claim 12 formed of sheet metal having great strength and high resistance to heat and corrosion.

SAMUEL K. WELLMAN.